Aug. 15, 1944. S. VORECH 2,355,612
BRAKE VALVE
Filed Dec. 28, 1942
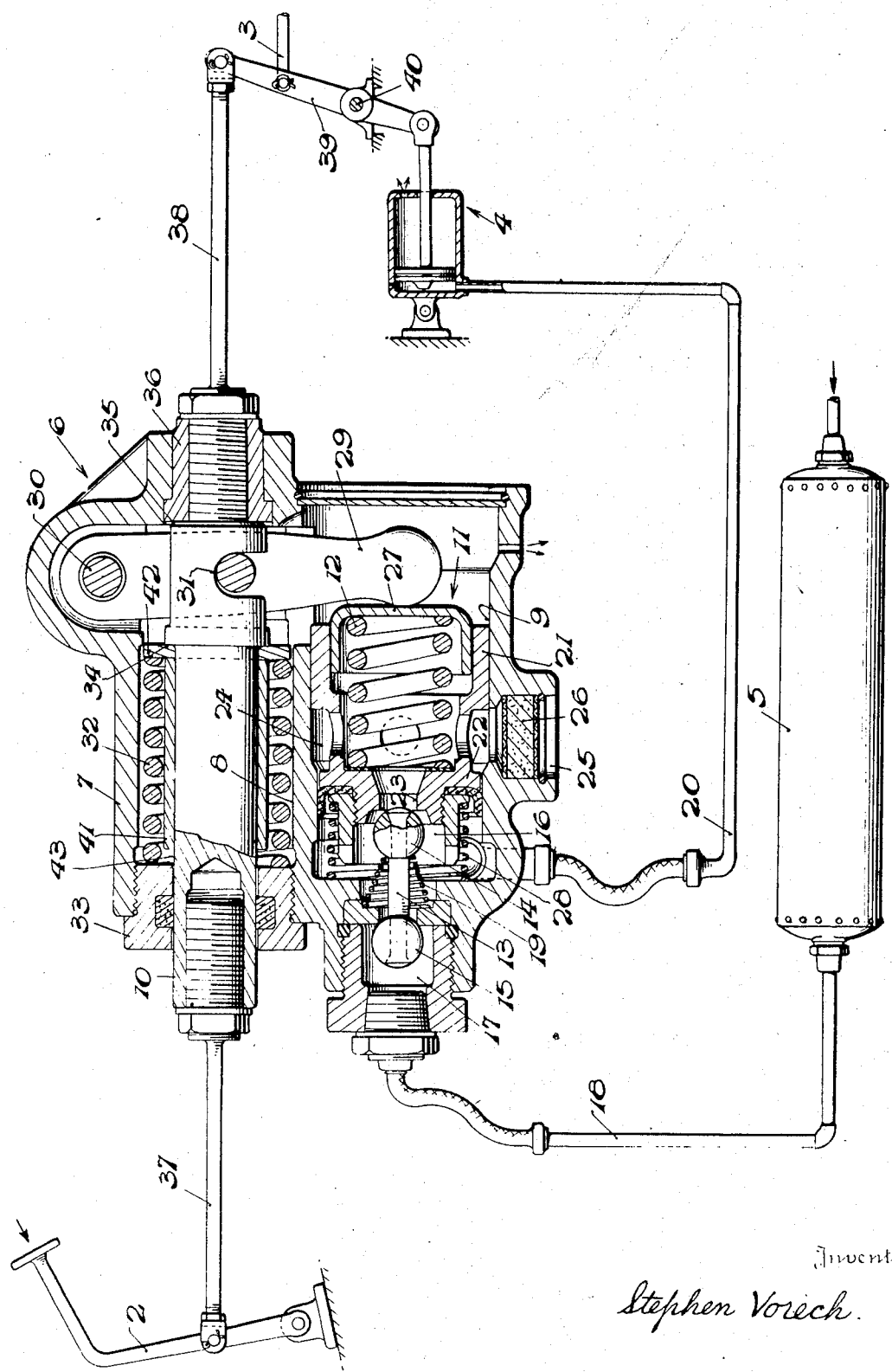
Inventor
Stephen Vorech.
By N. D. Parker Jr.
Attorney Patented Aug. 15, 1944

2,355,612

UNITED STATES PATENT OFFICE 2,355,612

BRAKE VALVE

Stephen Vorech, Elyria, Ohio, assignor to Bendix-Westinghouse Automotive Air Brake Company, Elyria, Ohio, a corporation of Delaware Application December 28, 1942, Serial No. 470,373

1 Claim. (Cl. 303—54)

This invention relates to valve devices and more particularly to that class of valves of the follow-up type for controlling fluid pressure operated apparatus, wherein provision is made for enabling the operator to readily control the operation of the fluid pressure apparatus while being apprised of the degree of actuation thereof, through reaction imparted to the operator's controlling member.

One of the objects of the present invention resides in providing a novel follow-up valve mechanism so arranged as to inform the operator, through reaction forces, of the degree of energization and hence actuation of a remotely positioned fluid pressure actuated device.

Another object is to provide an improved fluid pressure control valve of the self-lapping type wherein the arrangement is such that the opening and lapping operations of the valve may be more rapidly effected than heretofore.

Still another object is to provide a novel servomotor and valve arrangement for remotely operating any device through the application of fluid pressure and wherein the operator retains precise control of the operation.

A still further object is to provide, in a mechanism of the foregoing character, a novel and simplified arrangement of parts including provision for manual operation of the remotely-controlled device in the event of failure of fluid pressure.

Other objects and novel features of the invention will appear more fully hereinafter from the following detailed description of the invention when taken in connection with the accompanying drawing, wherein one form of the invention has been illustrated. It is to be expressly understood, however, that the drawing is utilized for purposes of illustration only and is not to be taken as a definition of the limits of the invention, reference being had for this purpose to the appended claim.

Referring to the drawing, the invention is disclosed therein as being embodied in a brake system but it is to be understood that the same may be utilized in any suitable arrangement, such as a steering mechanism or selectively operable brake devices for steering vehicles of the track type, the invention being capable of use in any arrangement wherein a mechanism is desired to be remotely controlled through the application of fluid pressure thereto and including operation of such mechanism by manual control in the event of failure of such pressure.

More particularly, the arrangement disclosed on the drawing includes a brake pedal or other suitable operator-controlled element 2, a brake rod 3 or other remotely-controlled device to be actuated, a fluid pressure actuator or motor 4, a reservoir 5 of fluid pressure, such as compressed air, for example, and a valve mechanism 6 for controlling the application of fluid pressure from the reservoir 5 to the motor 4.

The valve mechanism includes a casing 7 having a pair of parallel bores 8 and 9, the former slidably receiving a valve-actuating rod 10 while the latter is adapted to receive a self-lapping valve device generally indicated at 11. The latter valve device is of the type wherein a graduating spring 12 is employed, the arrangement being such that compression of the spring actuates the valve and controls the flow of fluid pressure from the reservoir 5 to the motor 4 in a degree proportional to the amount of compression of the spring. As the fluid pressure is conducted to the motor, the pressure reacts against the force initially acting upon the spring in order to convey a reaction or feel to the operator so that he may be readily apprised of the degree of pressure admitted to the motor and hence the degree of operation of the remotely-controlled part operated thereby.

As shown, the valve device 11 includes a valve 13 having exhaust and intake heads 14 and 15, respectively located in outlet chamber 16 and inlet chamber 17. The latter is in constant communication with the reservoir 5 by way of conduit 18 and is normally disconnected from chamber 16 by the intake valve head 15, a spring 19 moving the valve 13 to the position shown. Outlet chamber 16 communicates with the motor 4 through a conduit 20, and, when valve 13 moves to the left, as shown in the drawing, fluid pressure may pass from chamber 17 to chamber 16 and thence to the motor via the conduit 20.

Slidably mounted in the bore 9 is a valve-actuating member 21 which is provided at its left end portion with a pressure-responsive device 22. The latter is centrally bored to form an exhaust passage 23 which, in the position of the parts illustrated, normally serves to connect the outlet chamber 16 with an exhaust chamber 24, which latter communicates with the atmospheric connection 25 through a suitable filter 26. Spring 12 is interposed between the pressure-responsive device 22 and a cap 27 and may be compressed as heretofore indicated in order to effect operation of the valve 13.

From the foregoing description, it will be readily appreciated that the valve 13, in its normal position, has its intake portion 15 closed and its exhaust portion 14 open. Under these conditions, the motor 4 is exhausted to atmosphere through conduit 20, chamber 16, bore 23, chamber 24 and connection 25. A spring 28 normally serves to maintain the pressure-responsive member 22 in such position that the exhaust valve portion 14 is open.

In actuating the valve, spring 12 is compressed sufficiently to move the valve-actuating member 21 to the left, whereupon exhaust portion 14 will be closed and continued movement of the actuating element will open the intake portion 15 to conduct fluid pressure from the reservoir 5 to motor 4 by way of conduit 18, chamber 17 and conduit 20. In the event that movement of the valve-actuating element 21 is arrested, it will be appreciated that the pressure of the fluid in chamber 16 will react upon the pressure-responsive device 22 and, when this force of reaction is sufficient to overcome the compression of the spring 12, the element 22 will be moved to the right, as viewed in the drawing, an amount sufficient to close the intake portion 15. At this point, there will be no further increase in pressure of the fluid in chamber 16 and the valve parts will remain in a lapped position with both of the portions 15 and 14 closed. At the same time, a reactive force will be exerted through the spring 12 to the member which initially compressed the spring to secure operation of the valve.

In order to apply the actuating force above referred to, a novel lever construction is employed by the present invention and the arrangement is such that a decided mechanical advantage is secured in operating the valve. Thus, the movement of the valve is amplified as regards the movement of the operator-controlled element and a precise and sensitive control is achieved. As shown, a lever arm 29 is pivotally mounted at 30 within the housing 7, the lower end actuating the cap 27, the lever being connected intermediate its ends with the valve-actuating rod 10 as by means of a pin and slot connection 31. A spring 32, having one end bearing against a cap 33 secured to the housing and its other end acting against a shoulder 34 of the rod, normally serves to maintain the lever and housing in the relative position shown. In such position, the right end portion 35 of the rod 10 bears against a sleeve 36 secured in the housing.

In the particular arrangement illustrated, the pedal 2 is mechanically connected with the rod 10 as by any suitable link 37 while the housing 7 is connected with the brake linkage 3 by means of a rod 38. In this manner, actuation of the valve mechanism 6 is secured through operation of the lever 2 and the follow-up action of the valve is secured through rod 38 upon operation of the brake linkage 3, the latter being connected to rod 38 and to the pressure-responsive element of the motor 4 by a lever arm 39 pivoted at 40 to a suitable stationary portion of the vehicle.

In the operation of a servo-motor system, as above described, initiation of movement of the valve mechanism is secured by moving the pedal 2 in order to operate the lever 29 in a clockwise direction about the pivotal mounting 30. During this initial operation, the housing 7 remains stationary due to the fact that it is prevented from moving through its connection through rod 38 with the brake linkage 3 which offers sufficient resistance to movement in order that the foregoing operation of the lever 29 may be effected. As soon as the spring 12 has been compressed a sufficient amount to move valve-actuating element 21 to the left to operate the valve 13, the valve functions in the manner heretofore described to conduct fluid pressure to the motor 4 for the purpose of moving the brake linkage 3 by power and in accordance with the degree of movement of the pedal 2. Upon operation of the brake linkage, it will be understood that the lever arm 39 is moved counterclockwise about its pivot 40 and rod 38 in casing 7 is thus moved slightly to the left, as viewed in the drawing. This operation has the effect of moving the pivot 30 to the left and tending to move the arm 29 counterclockwise about such pivot. This action relieves somewhat the initial compression of the spring 12 and accelerates the lapping operation of the valve 13. Thus, the fluid pressure build-up in the motor 4 is secured in a more rapid manner due to the follow-up construction and slight movement of the valve housing 7 to the left after the pedal has been initially operated. This acceleration of the pressure build-up is secured while maintaining the desirable reaction against the operator's foot through the pressure within the chamber 16 exerted against the pressure-responsive member 22, through the spring 12 and to the rod 37 by lever 29 and valve-actuating rod 10.

In the event of power failure, the invention includes an arrangement for directly operating the valve linkage 3 by manual power alone. Such arrangement comprises a sleeve 41 slidably mounted on the valve-actuating rod 10 and normally bearing against a washer 42 which abuts the shoulder 34, there being a lost motion connection 43 between the left end portion of the sleeve and the cap 33. In normal operation, this lost motion connection is sufficient to enable proper operation of the valve and energization of the motor 4 by fluid pressure. However, in the event of power failure, movement of the pedal 2 a distance sufficient to take up the lost motion 43 serves to bring the sleeve 41 into engagement with the cap 33, whereupon the housing 7 and rod 38 are moved manually to effect operation of the brake linkage 3.

There has thus been provided by the present invention a novel valve mechanism combining the functions of a self-lapping valve and a follow-up valve, the construction being such that the usual reaction of the self-lapping valve is retained to apprise the operator of the degree of operation of the power-operated device, while the follow-up action enables a more rapid rate of build-up of fluid pressure. The construction also secures more rapid and precise control of the self-lapping valve through the type of lever employed, while manual control of the remotely-actuated part is secured in the event of power failure. Moreover, it will be readily understood that the construction provided is such that combined manual and power operation may be attained in the event that the valve-actuating rod is actuated in a sufficiently rapid manner as to bring the sleeve 41 and cap 33 into contact.

While one embodiment of the invention has been shown and described herein with considerable particularity, it is to be understood that various forms of the device may be resorted to without departing from the spirit of the invention, as well understood by those skilled in the art. It is to be particularly pointed out that, while the invention has been described in connection with a brake system, for example, the same is not limited to this application but may be employed in any system wherein an operator-controlled part is utilized for controlling a remotely-positioned device through the agency of fluid pressure and where it is desirable to control such remotely-positioned part manually in the event of power failure or to control the same by combined manual and fluid pressure operation.

It will also be understood that the invention provides a device capable of easy assembly. For example, it will be evident that the use of the lever 29 is desirable in order to permit operation of the self-lapping valve mechanism without the need for stuffing boxes and the like, which would be necessary in the event the valve mechanism were placed on the same line as the plunger 10. The lever is pivoted in the housing by means of the pin 30, and, in order to facilitate assembly and removal of the lever, the point of engagement of the lever with the plunger 10 through the pin 31 is the slot formed in the right end of the plunger, the open end of the lower bore 9 being closed by the plate and lock ring shown in the drawing to permit removal of the lever through this opening. The plunger 10 is supported at the left end of the upper bore by means of a threaded member 33 which permits removal of the entire plunger assembly through the left end of this bore. Thus, to remove the lever 29, we first remove the pin 30, dropping the lever downwardly to permit removal of the plunger 10 after removal of the closure member 33. After removal of these parts, the bushing 36, which is provided with a shoulder to carry the load exerted on the device may be readily removed or inserted, either through the upper bore or through the opening at the right end of the lower bore, preferably the former.

Various other embodiments and substitutions may be resorted to without departing from the spirit of the invention and it is to be expressly understood that the same is not limited other than by the terms of the appended claim.

What is claimed is:

A valve mechanism of the follow-up type having a single unitary casing provided with a pair of substantially parallel bores, a manually operable plunger slidably mounted in one of said bores for operating the valve mechanism, self-lapping valve means positioned in the other bore including inlet and exhaust valves, a pressure responsive element for controlling the operation of the valves, and a graduating spring for controlling the operation of the member, means for effecting an operating connection between the plunger and graduating spring including a lever having one end positioned in said one bore, and having an operative connection with said spring, a slot in said plunger, a pin carried by said lever for engagement with said slot, a pivot pin carried by the casing for pivotally mounting the other end of said lever, and a port in one end of said bore for permitting removal of said lever therethrough on removal of said pivot pin and on dis-engagement of said lever pin from said plunger slot.

STEPHEN VORECH.